A. F. RIETZEL.
ELECTRIC METAL WORKING APPARATUS.
APPLICATION FILED JULY 10, 1909.
1,049,920.
Patented Jan. 7, 1913.
2 SHEETS—SHEET 1.
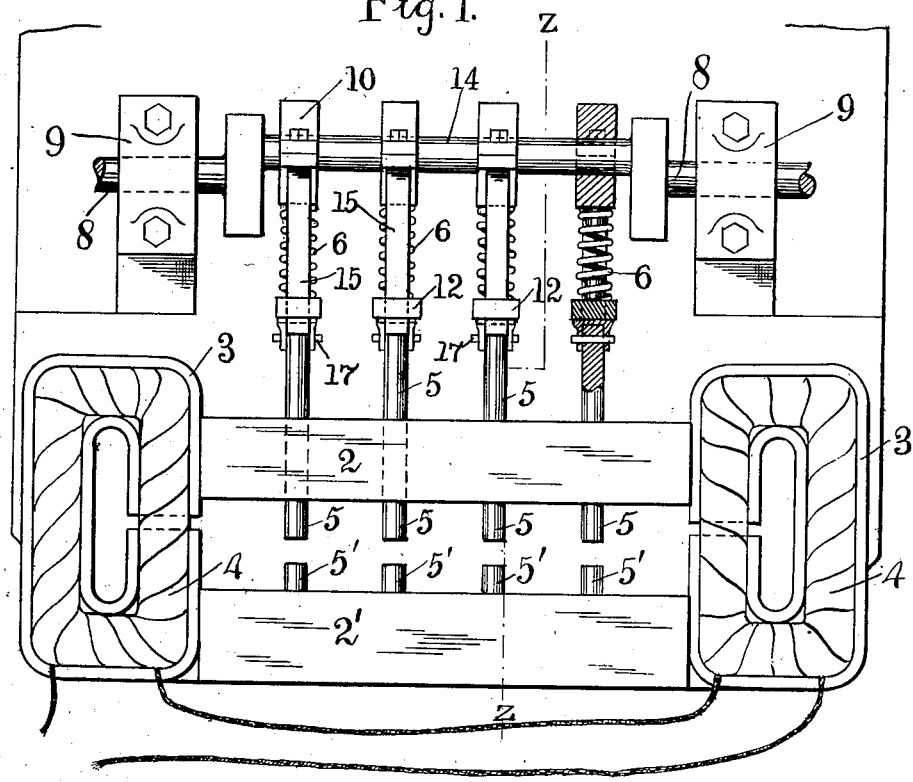
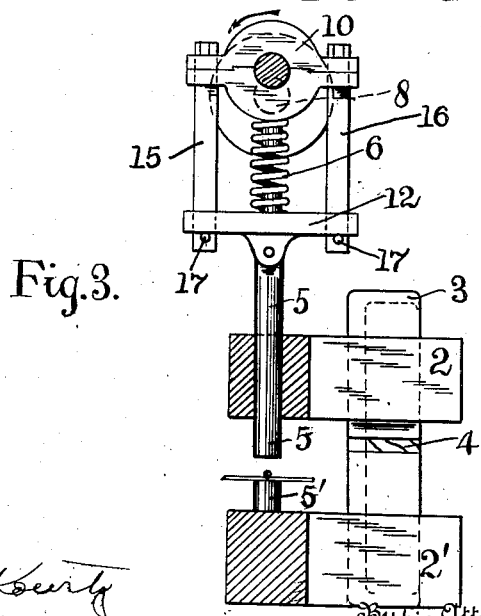
Inventor
Adolph F. Rietzel.

A. F. RIETZEL.
ELECTRIC METAL WORKING APPARATUS.
APPLICATION FILED JULY 10, 1909.

1,049,920.

Patented Jan. 7, 1913.
2 SHEETS—SHEET 2.

Witnesses
Irene Lefkowitz
Edward M Jellinek

Inventor
Adolph F. Rietzel
By his Attorneys
Townsend & Decker

UNITED STATES PATENT OFFICE.

ADOLPH F. RIETZEL, OF WESTERLY, RHODE ISLAND, ASSIGNOR, BY MESNE ASSIGNMENTS, TO THOMSON ELECTRIC WELDING COMPANY, OF LYNN, MASSACHUSETTS, A CORPORATION OF MASSACHUSETTS.

ELECTRIC METAL-WORKING APPARATUS.

1,049,920.  Specification of Letters Patent.  Patented Jan. 7, 1913.

Application filed July 10, 1909. Serial No. 506,963.

*To all whom it may concern:*

Be it known that I, ADOLPH F. RIETZEL, a citizen of the United States, and a resident of Westerly, in the county of Washington and State of Rhode Island, have invented certain new and useful Improvements in Electric Metal-Working Apparatus, of which the following is a specification.

My invention relates to electric metal working machines or apparatus and its object is to provide a simplified form of apparatus by means of which a number of electric welds or other metal working operations may be performed.

An apparatus constructed in accordance with my invention is particularly useful in making a line or series of welds and among other things may be used for welding together the strand and stay members of a wire fence or other metal fabric by welding the stay member at a number of its crossing points upon the strand members. My apparatus however is not limited to this class of work but may be used also in securing the members of other metal structures to one another at a number of points.

Figure 2:
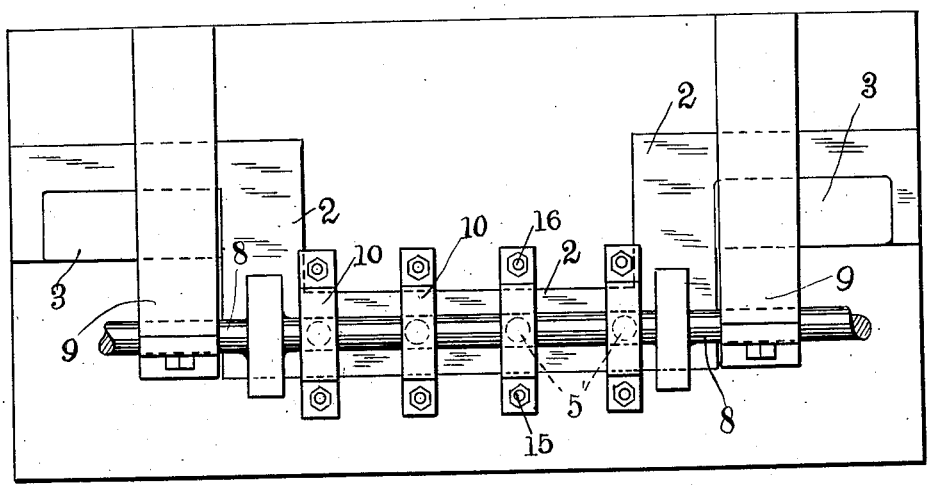
Figure 5:
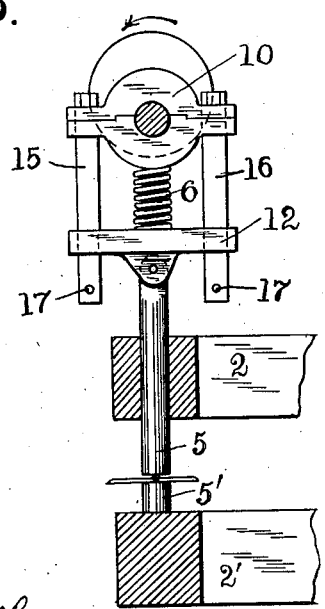
Figure 4:
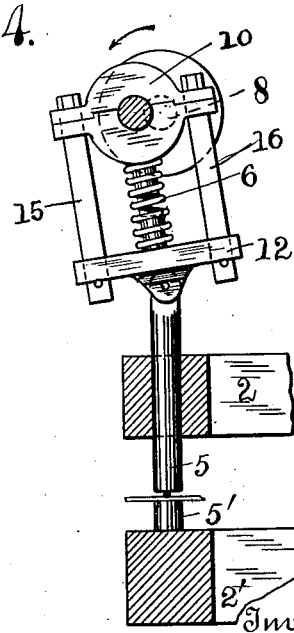

In the accompanying drawings Figure 1 is a front elevation of a form of apparatus embodying my invention. Fig. 2 is a plan view of the same. Fig. 3 is a vertical transverse section on the line Z Z Fig. 1 and shows the welding jaws or blocks in open position. Fig. 4 is a similar view to Fig. 3 showing the position of the parts when the jaws close on the work. Fig. 5 shows a further position of the same parts.

Referring to the drawings, 2, 2' indicate a pair of massive bars or blocks of copper or other good conducting material forming terminal bars of the sources of electric energy which supply said bars with the heating electric currents used for the welding or other operations performed upon the work arranged in the space between said bars. The source of current is, in the preferred form of my invention, the secondary or secondaries of a transformer whose primary is of a considerable number of turns as compared with that of the secondary, the latter being as usual in the art a large mass of copper and of one or more turns as desired. As shown, the two bars are fed from two cast copper secondaries 3 having grooves or recesses which receive the bundle of primary wire 4. Said secondaries have their poles connected as shown to opposite ends of the bars 2, 2' and feed current to said bars in multiple. The said bars may be straight bars extending from pole to pole of the secondaries or may take any form that convenience may dictate, having regard to the particular kind of work to be done. Preferably they are offset slightly from the plane of the secondaries to afford space for readily bringing the work to position between the work-engaging clamps, jaws or electrodes.

My invention is not confined to any particular construction of devices for holding and applying pressure to the work while supplying current thereto. What I show for the sake of illustration are pairs of welding jaws or electrodes, the opposite members of each of which pairs being mounted upon and receiving current respectively from the bars 2, 2', so that the work, while being compressed between said opposite members, will at the same time receive or be fed with current passing from one to the other member of the pair.

5' indicates a line or series of welding jaws or blocks suitably mounted upon and all receiving current from the bar 2' and 5 indicates a coöperating series or line of welding jaws or blocks suitably mounted upon and all receiving current from the opposite bar 2. The manner of attachment and mounting may be indefinitely varied without departing from my invention but for most kinds of work it is desirable to mount or secure the blocks or jaws 5' fixedly upon the bar 2' while the jaws or blocks 5 are slidably or flexibly mounted on the bar 2 so as to be capable of movement while at the same time receiving current from said bar. In the drawings I show each electrode or jaw 5 as slidably mounted. I show in the drawings four pars of jaws or electrodes 5, 5', the opposite members of each pair being mounted on said bars respectively, but a greater number of pairs might be employed without departing from my invention, the jaws or electrodes being preferably arranged in pairs. The form of the ends of the jaws or blocks where they engage the work would obviously vary according to the shape or kind of work received between them. I therefore have not shown any particular conformation of the ends of the jaws excepting that they are made flat, in order that the jaws or electrodes may act independently of one another and each pair may properly do its work although the metal may not soften so as to yield under the pressure between all the pairs of jaws preferably simultaneously. It is preferred to provide each jaw or electrode 5 with a spring 6 interposed between the same and the actuating device, each jaw becoming thereby a spring-pressed electrode working independently of all the others as regards pressure upon the work although all may be simultaneously actuated by a common actuating device. Such actuating device may be of any desired construction. The form shown comprises a shaft 8 adapted to rotate in bearings 9 secured to the frames of the apparatus and is provided with a crank or eccentric 14. The said crank is connected to cross-heads 12 pivotally secured to the electrodes 5 by a pair of connecting rods 15, 16 fixedly secured to bearings 10 in which the crank or eccentric 14 is journaled. The connecting rods 15, 16 pass loosely through the cross-heads 12 and hold the electrodes 5 raised from the work by means of pins 17 passing transversely through the rods and engaging the under side of the cross-heads 12. Coiled or other springs 6 compressed between the crank bearings 10 and the cross-heads 12 normally tend to keep the cross-heads pressed against the pins 17.

When the crank 14 rotates the electrodes 5 will be forced down by the springs 6 until they engage the work as shown in Fig. 4. A further rotation of the crank causes the connecting rods 15, 16 to travel and the pins 17 to leave the cross-heads 12 and the springs 6 are further compressed and apply the necessary pressure in the welding or other operation, which position is shown in Fig. 5. The electrodes are withdrawn for insertion of a new piece of work by means of the pins 17 engaging the under sides of the cross-heads 12 and raising the same due to the rotation of the crank 14 on its up-movement.

In order that welding or heating current to approximately the same amount may pass between the pairs of the electrodes irrespective of the distance of said electrodes from the ends or parts of the bars to which the transformer secondaries or other source of energy is directly connected, said bars should be made of very large cross-section so that the drop of potential in the portion of bar between any two jaws or electrodes 5 will be a minimum.

While also my invention is not limited to any particular manner of connection of the primary of the transformers with the source of alternating current good results as regards the uniformity of current flow between the several pairs of electrodes are obtained by connecting the primaries in series with one another as shown.

It will be obvious to those skilled in the art that the construction of apparatus shown lends itself particularly to use in welding up of metal fabrics since the strand members of said fabrics may pass transversely through the space between the bars 2, 2' while the overhang of the bars or of the electrodes mounted thereon between the plane of the transformers gives facility for laying the stay member in place on the line of the series of pairs of jaws or electrodes.

What I claim as my invention is:

1. In an electric metal working apparatus, the combination of a pair of current supplying terminal bars of opposite polarity extending respectively from pole to pole of two sources of electrical energy and a plurality of pairs of work-engaging electrodes, the opposite members of each pair being mounted respectively on the members of said pair of terminal bars.

2. In an electric metal working apparatus, the combination of a pair of terminal bars extending from pole to pole of two transformer secondaries and a plurality of work-engaging blocks mounted on one of said bars, a plurality of coöperating spring-pressed blocks movably mounted on and deriving current from the opposite bar and means for actuating the latter blocks to apply pressure to the work.

3. In an electric welding machine, the combination of a pair of conducting bars, a pair of transformer secondaries having their poles bridged by said bars, said bars terminating respectively in pole ends of the same sign, a plurality of welding jaws mounted in series along the axial line of one of said bars, a plurality of coöperating jaws mounted similarly on the opposite bar and means for actuating said jaws.

4. In an electric metal working apparatus, the combination of a pair of bars of copper or other good conducting material, a pair of transformers having their secondaries connected to and electrically bridged by said bars and feeding current thereto in multiple and a plurality of welding devices mounted in pairs on said bars and deriving welding current therefrom.

5. In an apparatus of the class described, a set of substantially parallel bar conductors lying side by side in spaced relation, a transformer having its positive lead connected to the end of one bar and its negative lead connected to the associate end of the other bar, and a second transformer having its leads similarly connected to the other ends of said bars.

6. In an apparatus of the class described, the combination of two transformers, and a set of laterally spaced bar conductors having one of their ends each connected to the leads of one transformer and their opposite ends connected to the leads of the other
5 transformer, whereby an electrical connection of the two bars may close a circuit through either transformer.

Signed at Lynn in the county of Essex and State of Mass. this 8th day of July A. D. 1909.

ADOLPH F. RIETZEL.

Witnesses:
S. A. NICHOLS,
E. G. MITCHELL.